(12) United States Patent
Brucato

(10) Patent No.: US 8,651,570 B2
(45) Date of Patent: Feb. 18, 2014

(54) PROTECTIVE HEADREST

(76) Inventor: Terri L. Brucato, Hamburg, NJ (US)

( * ) Notice: Subject to any disclaimer, the term of this patent is extended or adjusted under 35 U.S.C. 154(b) by 61 days.

(21) Appl. No.: 13/506,446

(22) Filed: Apr. 19, 2012

(65) Prior Publication Data

US 2013/0278027 A1 Oct. 24, 2013

(51) Int. Cl.
*B60N 2/42* (2006.01)
*B60N 2/48* (2006.01)
*B60R 21/055* (2006.01)

(52) U.S. Cl.
USPC ....... 297/216.12; 297/391; 297/397; 297/405

(58) Field of Classification Search
USPC .............................. 297/216.12, 391, 405, 397
See application file for complete search history.

(56) References Cited

U.S. PATENT DOCUMENTS

| | | | |
|---|---|---|---|
| 3,480,976 A | 12/1969 | Yavner | 5/639 |
| 3,608,965 A | 9/1971 | Cziptschirsch et al. | 297/410 |
| 3,865,450 A * | 2/1975 | Bruenig | 297/397 |
| 4,003,599 A | 1/1977 | Takamatsu | 297/220 |
| 4,744,601 A * | 5/1988 | Nakanishi | 297/216.12 X |
| 5,108,150 A | 4/1992 | Stas et al. | 297/397 |
| 5,135,283 A | 8/1992 | Cassese et al. | 297/397 |
| 5,154,477 A | 10/1992 | Lacy | 297/397 |
| 5,290,091 A * | 3/1994 | Dellanno et al. | 297/216.12 X |
| 5,664,840 A | 9/1997 | Stenzel | 297/391 |
| 5,964,504 A | 10/1999 | Hogan et al. | 297/397 |
| 6,158,812 A * | 12/2000 | Bonke | 297/216.12 X |
| 6,213,548 B1 * | 4/2001 | Van Wynsberghe et al. | 297/216.12 |
| 6,435,617 B1 | 8/2002 | McNair | 297/397 |
| 6,619,751 B1 * | 9/2003 | Shah | 297/464 |
| 6,669,300 B1 | 12/2003 | Lee | 297/397 |
| 6,709,062 B2 * | 3/2004 | Shah | 297/216.12 X |
| 6,820,930 B2 * | 11/2004 | Dellanno | 297/216.12 |
| 6,883,870 B2 | 4/2005 | Jost | 297/391 |
| 7,556,313 B2 * | 7/2009 | Browne et al. | 297/216.12 |
| 7,594,697 B2 * | 9/2009 | Browne et al. | 297/216.12 |
| 7,926,871 B2 | 4/2011 | Meixner et al. | 297/216.12 |
| 8,033,603 B2 | 10/2011 | Meert | 297/220 |
| 8,191,969 B2 * | 6/2012 | Demaras | 297/397 |
| 2001/0040396 A1 | 11/2001 | Kreuels et al. | 297/216.12 |
| 2005/0006941 A1 | 1/2005 | Park | 297/406 |
| 2006/0250015 A1 | 11/2006 | Buck | 297/397 |
| 2009/0315372 A1 * | 12/2009 | Tracht | 297/216.12 |
| 2010/0237677 A1 * | 9/2010 | Nam | 297/391 X |
| 2011/0285194 A1 | 11/2011 | Marom | 297/404 |
| 2012/0161489 A1 * | 6/2012 | Nam | 297/391 X |
| 2013/0113262 A1 * | 5/2013 | Nam | 297/391 X |

* cited by examiner

FOREIGN PATENT DOCUMENTS

| | | | |
|---|---|---|---|
| WO | WO2005000629 | 1/2005 | .............. B60N 2/48 |
| WO | WO2012015371 | 2/2012 | |

*Primary Examiner* — Rodney B White
(74) *Attorney, Agent, or Firm* — Ernest D. Buff & Associates, LLC; Ernest D. Buff; Margaret A La Croix

(57) ABSTRACT

A protective headrest for land vehicles provides ergonomic support and protection against injury to a passenger's head and spine. The protective headrest has a back wall, sides, top and front wall. The front wall includes a head support segment co-joined and adjacent to a spine support segment. The head support segment has a semi-spherical concave curvature adapted and shaped to correspond with a passenger's head. The spine support segment is substantially shaped as a convex curvature adapted and shaped to correspond with the passenger's spine region at the neck-head interface. The spine support segment is located proximate and adjacent to the head support segment on a vertical plane. Preferably, the headrest includes a memory foam or other moldable insert within the head support segment and/or the spine support segment.

14 Claims, 10 Drawing Sheets

[Prior Art]

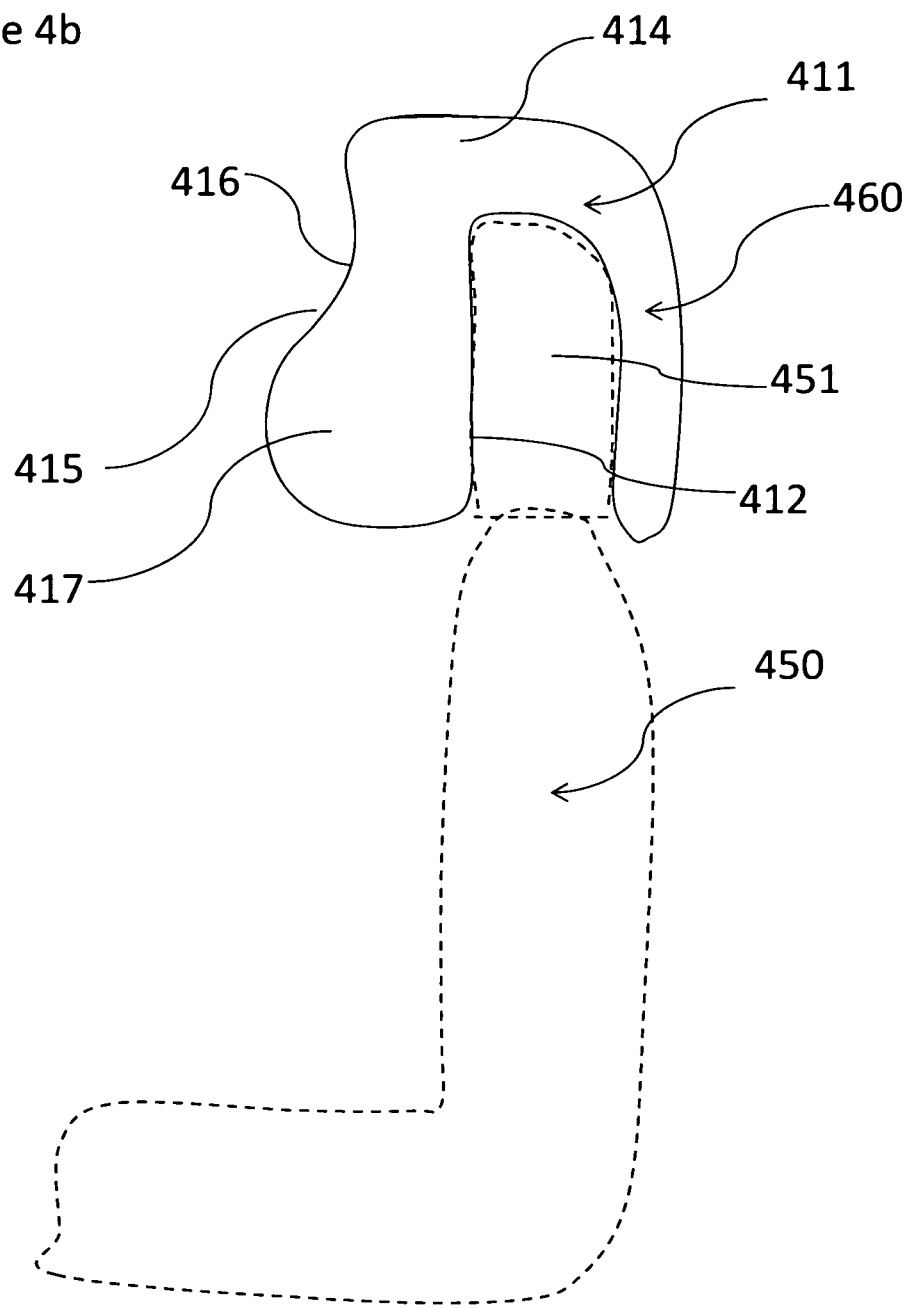

PROTECTIVE HEADREST

BACKGROUND OF THE INVENTION

1. Field of the Invention

The present invention relates to headrests; and, more particularly, to headrests for moving vehicles, including land, air and water vehicles.

2. Description of the Prior Art

Whiplash, a non-medical term, describes injury to the neck associated with extension caused by or ancillary to a sudden distortion of the neck. Cervical acceleration-deceleration (CAD) involves the mechanism of the sudden distortion of the neck. Whiplash associated disorders (WAD) describes the injury and symptoms resultant from CAD, although the exact injury mechanism that causes whiplash is unknown. It is believed that a whiplash injury results from impulsive stretching of the spine and/or ligaments therein which stretch or tear as the head snaps forward and then back again.

Symptoms of whiplash include pain and aching of the neck and back, referred pain in the shoulders, sensory disturbance to arms and legs, and headaches. Whiplash injury is usually confined to the spinal cord, and the most common areas of the spinal cord affected by whiplash are the neck, and the mid-back. Disorders can include injury to the cerebrum, and even brain injury in severe cases.

Whiplash frequently results from motor vehicle accidents and generally occurs when a vehicle has been hit in the rear, or from sudden stops, though the injury can be sustained in a variety of ways, including from falls, bicycle and horseback riding. Vehicular preventative measures have revolved around vehicular headrests. Headrests currently devised for land vehicles are typically constructed as a square or parallelogram shaped with a substantially flat relatively firm cushion adjusted to rest behind the passenger's head. It is believed that when driving, the height of the head restraint is a critical factor that influences injury risk. Conventional designs suggest that the headrest should be at least as high as the head's center of gravity, and that the distance behind the head should be as small as possible. Although vehicle headrests have been found to decrease whiplash and whiplash related injuries, the injury reducing effects are not considered significant, and headrest constructs need improvement. Current headrests provide a small distance behind the head at the head's center of gravity, but fail to adequately support the head and spine. Many headrests are positioned at an angle that pushes the head forward. These angled headrests present significant problems, and seem to predominate in lower end as well as more expensive vehicles. Lack of proper support not only impedes comfort, but also exasperates injury during accidents. As a result, current headrests are not found to significantly reduce whiplash injury to a large degree.

Other headrests designs include strap mechanisms or the like, which attempt to secure a passenger's neck against the headrest. However, these devices can be uncomfortable to use, and can even impede driving ability by holding the head in a given spot. With such designs, turning the head and/or bending the head forward become more difficult. Furthermore, with such strap mechanism headrest designs, lack of proper support exists for both the head and the spine region.

There remains a need in the art for an ergonomically constructed headrest that effectively supports the head while providing support to the spine region. Specifically, there is a need in the art for a headrest that is shaped and contoured to ergonomically support a passenger's head and neck to provide comfort and enhanced protection from head and neck injuries caused by sudden stops and/or accidents.

SUMMARY OF THE INVENTION

The present invention is directed to a protective headrest for land vehicles that provides ergonomic support to a passenger's head and spine. The protective headrest is shaped and contoured to a passenger's head and neck. Further, it is composed of materials that conform to the passenger's head and spine. Advantageously, the protective headrest for land vehicles provides comfort, ergonomics, and enhanced protection from head and neck injuries that might otherwise result from sudden stops and/or accidents.

In one embodiment, the protective headrest for land vehicles provides ergonomic support and protection to a passenger's head and spine from injury. The protective headrest is constructed having a back wall, sides, top and front wall. The front wall includes a head support segment co-joined and adjacent to a spine support segment. The head support segment has a semi-spherical concave curvature adapted and shaped to correspond to a passenger's head. The spine support segment is substantially shaped as a convex curvature adapted and shaped to correspond to the passenger's spine region at the spine-neck-head interface. The spine support segment is located proximate and adjacent to the head support segment on a vertical plane. Preferably, the headrest includes a memory foam or other moldable insert within the head support segment and/or the spine support segment.

Other embodiments of the protective headrest include a foam insert located in the head support segment, and/or in the spine support segment to dampen the forces related to acceleration/deceleration injury (i.e. whiplash). The optional foam insert is preferably a memory foam or the like that conforms to and cradles the passenger's head and/or spine region. In conjunction with, or alternatively to a foam insert, there may preferably be used foam beads/balls, soybeans or other small particulates that form a bean bag type cushioning. Other inserts contemplated include egg-crate shaped foam pad inserts, and/or memory foam cushions. The subject protective headrest for land vehicles may be anchored to a seat in a land vehicle. Alternatively, the subject protective headrest can be utilized in non-land vehicles as well, including, inter alia, water vehicles (boats), air vehicles (air planes), and the like. It should be noted that the subject protective headrest may be integrated within the seat or may be an add-on headrest or a headrest covering or attachment.

BRIEF DESCRIPTION OF DRAWINGS

The invention will be more fully understood and further advantages will become apparent when reference is had to the following detailed description and the accompanying drawings, in which:

FIG. 4b illustrates the headrest placed upon the existing vehicle headrest;

FIG. 5b illustrates a top view of the embodiment of FIG. 5a;

FIG. 7a illustrates a front view of another embodiment of the protective headrest;

FIG. 7b illustrates a side view of the embodiment of FIG. 7a;

FIG. 8b illustrates a top view of the embodiment of FIG. 8a.

DESCRIPTION OF THE PREFERRED EMBODIMENTS

The present invention is directed to a headrest devised for land vehicles constructed to provide an ergonomic, comfortable headrest that mitigates neck and spinal injuries associated with vehicular collisions. Despite the advent of headrests, the incidence of spinal, neck and head injuries has decreased only slightly (~5%). The subject headrest represents a significant improvement over previous headrests in terms of comfort and the mitigation of spine and head injuries. Advantageously, the headrest described herein, provides molded support for both the head at the center of gravity area (center, back of head) and the spine. The ergonomic support thereby provided to the spine and head significantly mitigates whiplash injuries. When the head support portion of the headrest is constructed with a concave semi-spherical moldable curve that accommodates and receives a person's head at the center of gravity area, whiplash injury is further mitigated. Enhanced protection from injury is further achieved by provision of a convex cervical region that supports the spine.

Figure 1:
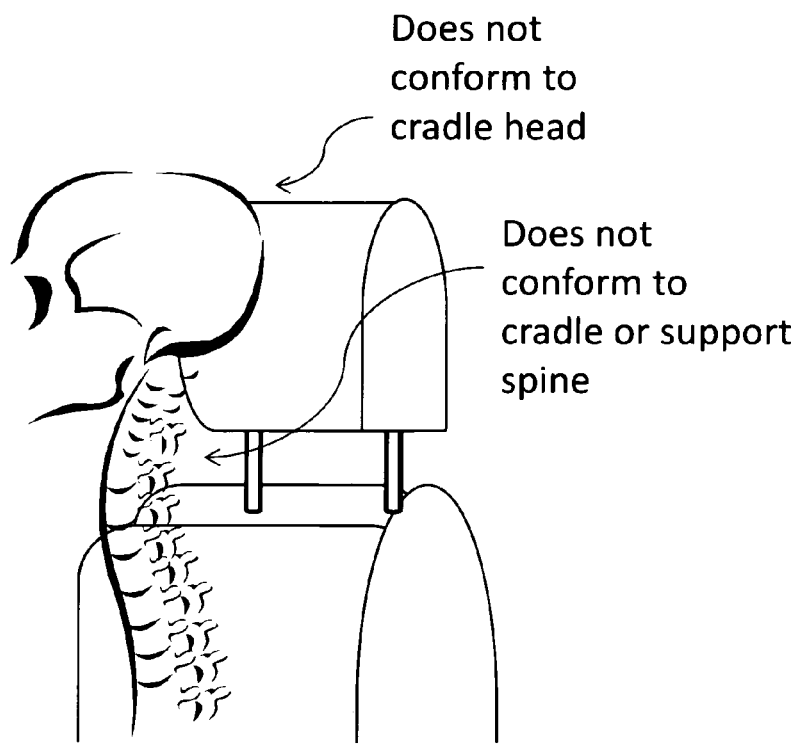
FIG. 1 illustrates a view of a passenger's head and spine as it rests against common prior art headrests heretofore known in the art.

FIG. 1 herein illustrates a passenger's head and spine as it rests against common headrests heretofore known in the art. The figure illustrates the lack of proper support for the head, spine and neck of a passenger. The height of the head restraint is a critical factor that influences injury risk when driving. It is recommended that the headrest should be at least as high as the head's center of gravity so that the distance behind the head and the headrest is as small as possible. Without being bound by theory, it is postulated that headrest designs utilizing a flat or substantially flat head-headrest interface in relation to a head's center of gravity area ineffectively deter spinal injuries and, in fact, may even contribute to spine and neck injuries. Owing to the flat or substantially flat headrest surface, the area between the head and the headrest, although small, is nonetheless too large to prevent the whiplash action created when the head snaps forward and back, causing neck injury and spinal strain. The protective headrest described herein provides a concave curvilinear surface that receives the head. The distance between the head at its center gravity is very small, since the head's center of gravity area remains in contact with the concave curve. At the same time, the protective headrest includes a convex cervical portion that supports the back of the neck at the spine-head interface to mitigate extension of the spine during an accident.

Current headrests for land vehicles are generally constructed as a square or parallelogram shaped, generally flat or concave, relatively hard cushion, as shown in FIG. 1. As a result, current headrests do not offer comfort to car passengers, and indeed have contributed to whiplash and other head, neck and spine trauma during accidents. Owing to the flat or slightly concave nature of current headrests, a passenger's head and spine are not adequately or ergonomically supported. Lack of proper support not only impedes comfort, but in some cases can exasperate injury during accidents.

The protective headrest for land vehicles provides ergonomic support to a passenger's head and spine for comfort and mitigation of injury. Uniquely, the protective headrest is shaped and contoured to a passenger's head and neck. Moreover, the protective headrest is composed of materials that conform to the passenger's head and spine. Advantageously, the protective headrest provides comfort and ergonomics, as well as enhanced protection from head and neck injuries that might otherwise result from sudden vehicular stops and/or collisions.

Figure 2:
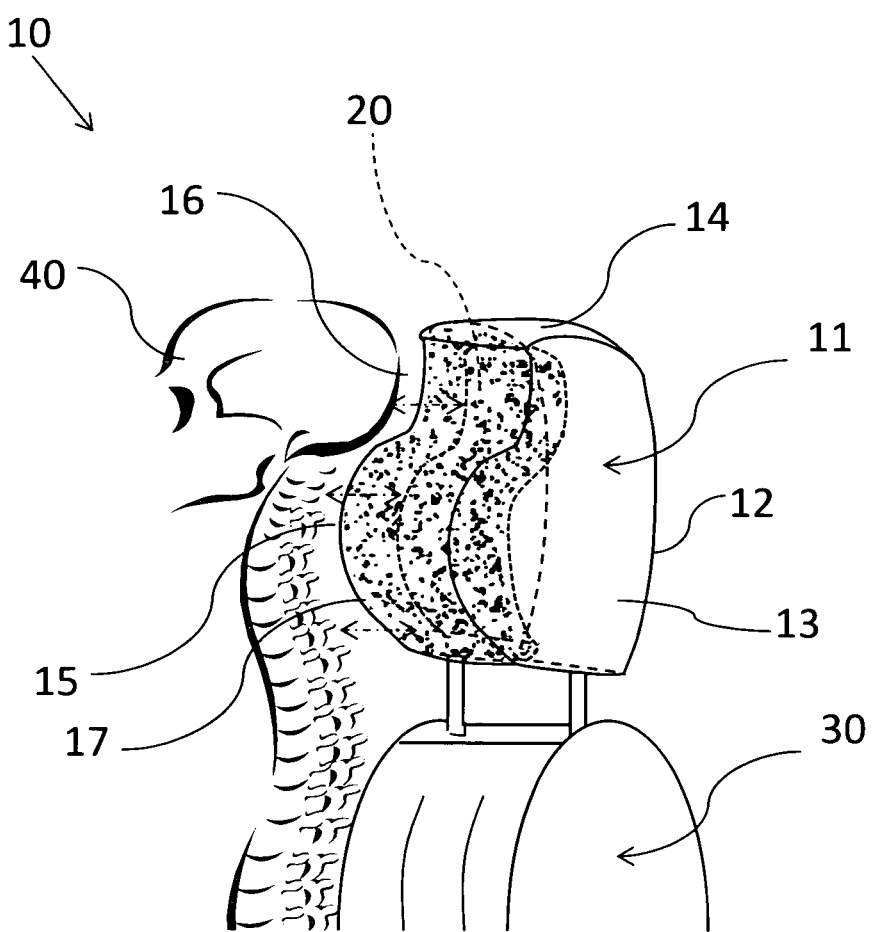
FIG. 2 shows a schematic view of the protective headrest for land vehicles of the subject invention shown in conjunction with a vehicle seat.

FIG. 2 illustrates a schematic view of an embodiment of the protective headrest for land vehicles of the subject invention shown in conjunction with a seat, shown generally at 10. The protective headrest for land vehicles 11 is shown anchored to a seat 30 in a land vehicle. Alternatively, headrest 11 can be utilized in non land vehicles as well, including, inter alia, water vehicles (boats), air vehicles (air planes), and the like. It should be noted that the headrest 11 may be integrated within the seat 30 or may be an add-on headrest 11 or a headrest covering or attachment. Headrest 11 generally comprises a back wall 12, sides 13, top 14 and front wall 15. Front wall 15 generally includes a head support segment 16 and a spine support segment 17. Head support segment 16 is substantially shaped having a concave curvature in relation to a passenger's head 40. In this manner, head support segment 16 conforms to and cradles the passenger's head 40.

Spine support segment 17 is substantially shaped having a convex curvature in relation to a passenger's spine region 41 proximate to the passenger's head 40. Convex curvature of the spine support segment 17 is adapted to conform to and cradle and support the passenger's spine region 41. Ergonomic support is thus provided to the passenger's head and spine. Preferably, headrest 11 includes a foam insert shown generally at 20 to dampen the forces related to acceleration/deceleration injury (i.e. whiplash). Foam insert 20 is preferably a memory foam or the like that conforms to and cradles the passenger's head 40 and spine region 41. In conjunction with, or alternatively to foam insert 20 there may be used foam beads/balls, soybeans or other small particulates that form a bean bag type cushioning. Other inserts contemplated include egg-crate shaped foam pad inserts, and/or memory foam cushions.

Figure 3A:
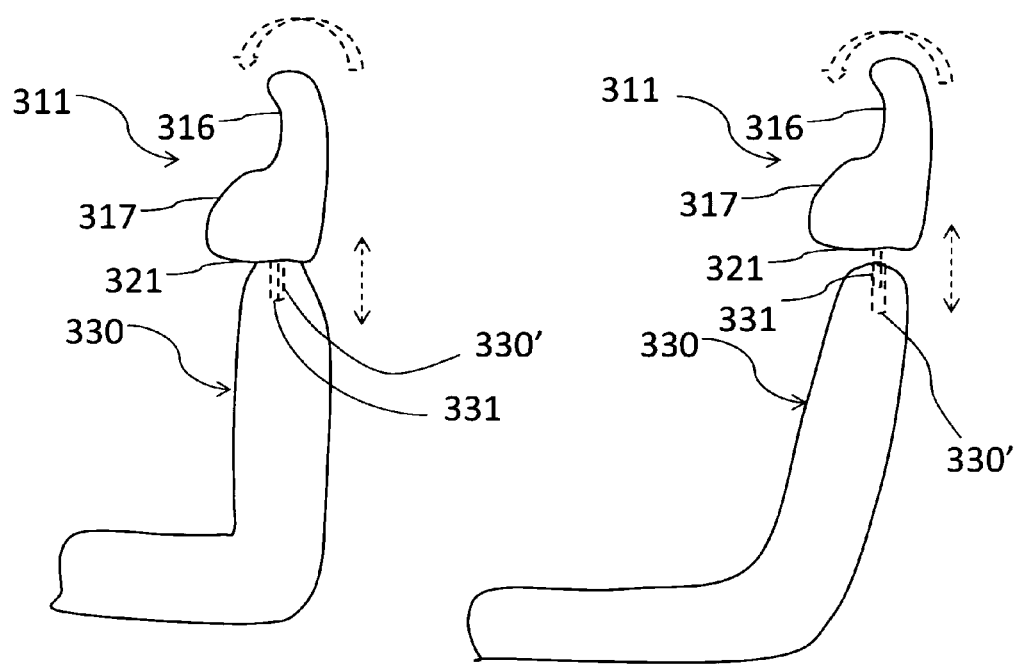
FIG. 3a illustrates views of an embodiment of the protective headrest showing forward and backward movement of the protective headrest.
Figure 3B:
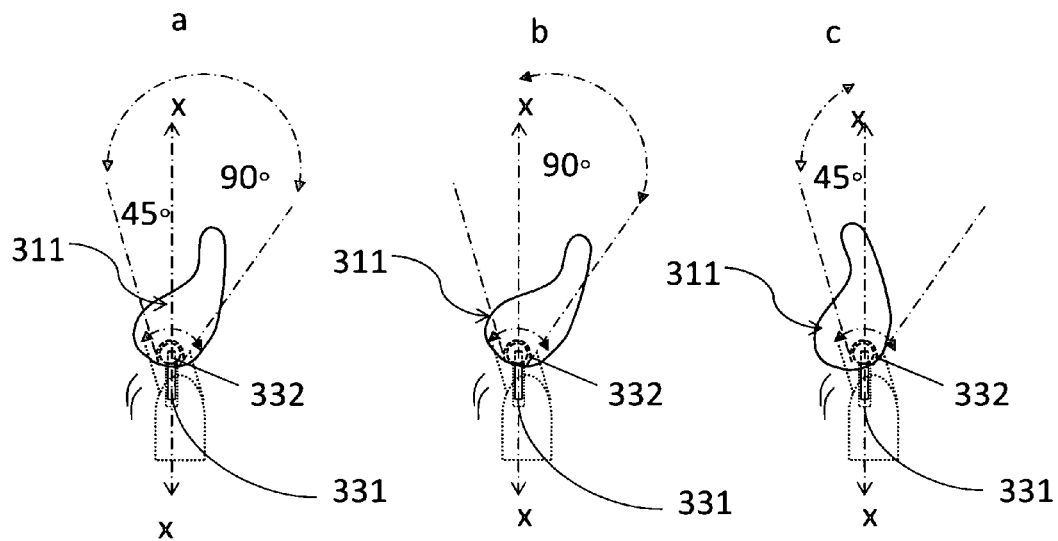
FIG. 3b illustrates views of the protective headrest showing plane, forward and backward adjustment or movement of the protective headrest.
Figure 3C:
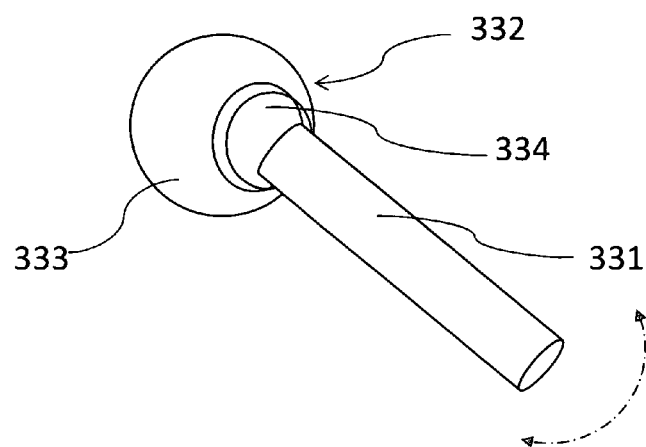
FIG. 3c illustrates a view of an optional joint like mechanism provided within the protective headrest for plane, forward and backward adjustment or movement of the protective headrest.

Optionally, the protective headrest includes support rods in communication with a tilting mechanism integrated therein for to and fro movement of said protective headrest, as well as the rods including vertical adjustment. Vertical adjustment mechanisms concerning car seat headrests are known in the art, and often include arrangements wherein the vertical rods include notches therein that are received within apertures in the seat top and catch on teeth at a given height. Tilting mechanisms utilized with the protective headrest may involve currently known tilt-adjustment headrest devices, including tilt-adjustment headrests having ratcheting mechanisms of the type described in U.S. Pat. No. 5,238,295. Alternatively, the tilting mechanism may be constructed as a ball-and-joint mechanism, depicted generally in FIGS. 3a-3c. FIG. 3a illustrates views of an embodiment of the protective headrest showing forward and backward movement of the protective headrest. FIG. 3b illustrates views of the protective headrest showing plane, forward and backward adjustment or movement of the protective headrest. FIG. 3c illustrates a view of an optional joint-like mechanism provided within the protective headrest for plane, forward and backward adjustment or movement of the protective headrest. Referring to FIGS. 3a-3c, in the embodiment shown a protective headrest 311 for land vehicles is inserted within a seat 330 in a land vehicle. Headrest 311 generally includes a head support segment 316 and a spine support segment 317. Headrest 311 comprises a bottom wall 321. In the embodiment shown, the bottom wall 321 of the headrest 311 having support rods 331 that traverse vertically up and down within cavity 330' of seat 330. As illustrated in FIG. 3b, support rods 331 are in communication with a tilting mechanism 332 integrated within headrest 311 for to and fro movement (back and forth rotational movement) of said protective headrest 311. FIG. 3b shows the headrest 311 in position "a" wherein a centerline x is provided. As indicated by the arrow, rotation of the headrest 311 is backward for up to about a maximum of 90° ' as shown in position "b"; and forward for up to about 45° from centerline x, as shown in position "c". As best shown in FIGS. 3b and 3c, the tilting mechanism 332 may be constructed as a ball-and-joint mechanism wherein a joint 333 is integrated within headrest 311 that is in communication with a ball 334 attached to rod 331. The ball-and-joint structure of tilting mechanism 332 may include a ratchet or grooves within ball 334 that catch on tongue surfaces of joint 333 for locking movement of the headrest on its rotary plane.

Figure 4A:
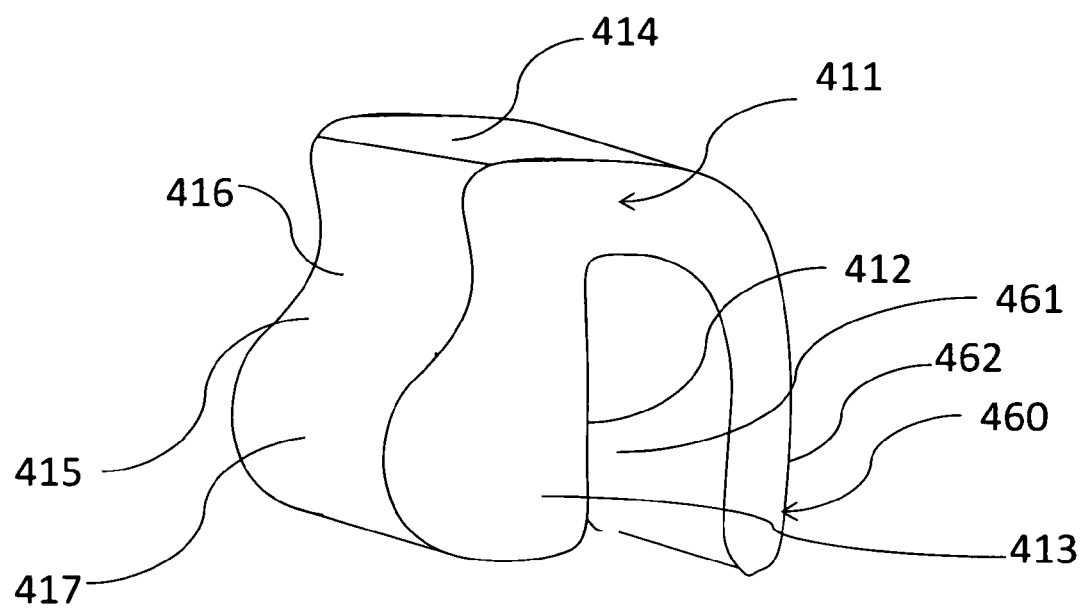
FIG. 4a illustrates a side view of another embodiment of the protective headrest wherein the headrest is appointed to be placed over an existing vehicle seat.

FIGS. 4a-4b illustrate an embodiment of the subject protective headrest wherein the headrest does not include support rods, but instead is appointed to be placed over an existing vehicle headrest. In this embodiment a removable protective headrest 411 is shown that is appointed to be anchored upon an existing seat's 450 headrest 451 (see FIG. 4b). Headrest 411 generally comprises a back wall 412, sides 413, top 414 and front wall 415. Front wall 415 generally includes a head support segment 416 and a spine support segment 417. In the embodiment shown, protective headrest 411 includes a substantially u-shaped back extension 460 appending from the back wall 412. This u-shaped back extension 460 is adapted and shaped to correspond to vehicle headrest 451 for mounting the protective headrest 411 over the vehicle headrest 451. U-shaped back extension 460 extends from top 414 leaving a cavity 461 between back wall 412 and u-shaped back extension leg 462.

Figure 5A:
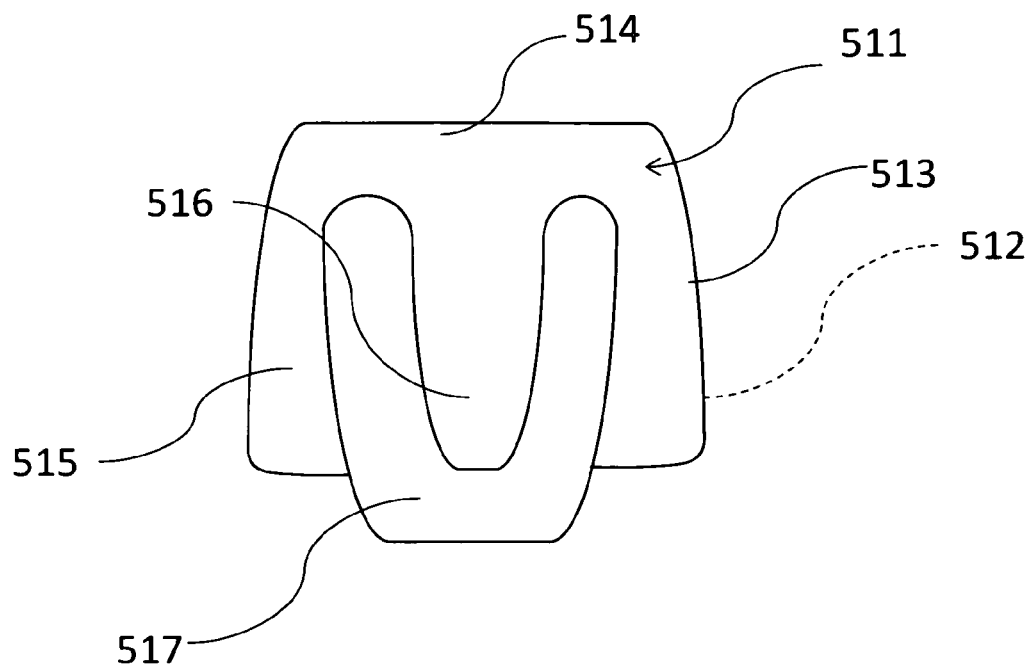
FIG. 5a illustrates a front view of another embodiment of the protective headrest.
Figure 5B:
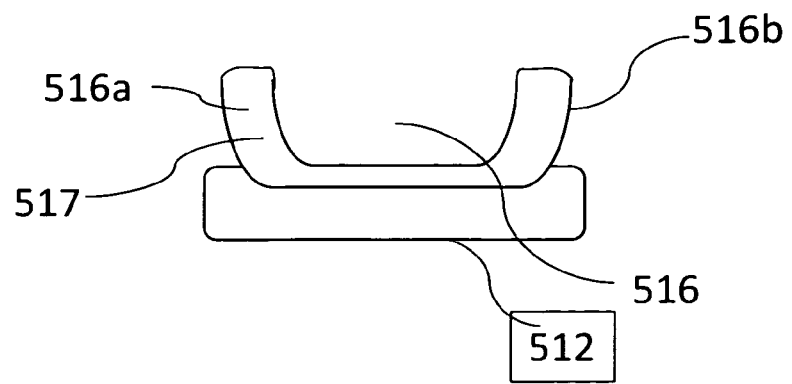

FIG. 5a illustrates a front view of another embodiment of the protective headrest, while FIG. 5b illustrates a top view of the embodiment of FIG. 5a. A protective headrest 511 is shown that is appointed to be anchored upon an existing seat's headrest as discussed in FIGS. 4a-4b, or may include rods as discussed in FIGS. 2-3. Headrest 511 generally comprises a back wall 512, sides 513, top 514 and front wall 515. Front wall 515 generally includes a head support segment 516 and a spine support segment 517. In the embodiment shown, spine support segment 517 abuts from front wall 515 of head support segment 516 and is formed as a u-shaped spine support. In this manner, spine support segment 517 acts to cradle the bottom of the head-neck interface while sides of the u-shape, 517a and 517b cradle the sides of the head up toward the ears.

Figure 6:
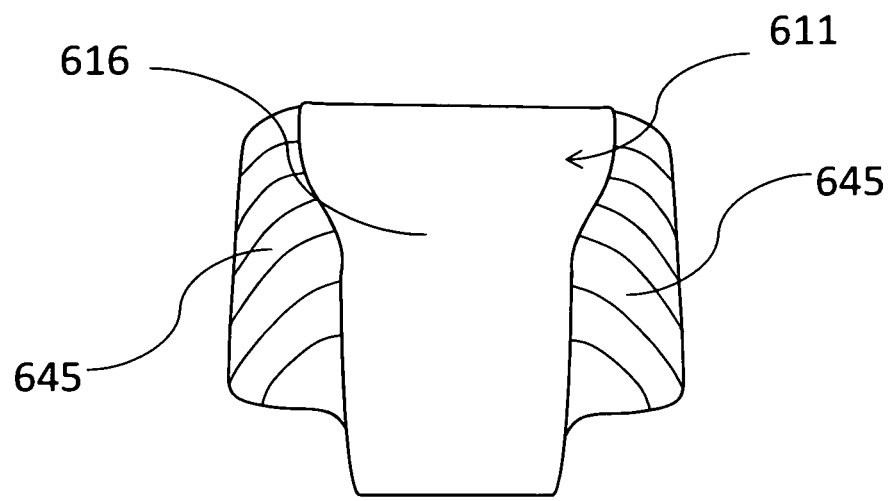
FIG. 6 illustrates a front view of another embodiment of the protective headrest.

FIG. 6 illustrates a front view of another embodiment of the protective headrest, shown generally at 611 wherein the headrest is constructed as set forth hereinabove, but further includes parallel lateral segments 645 located on opposing sides of said semi-spherical concave curvature via head support segment 616.

Figures 7A, 7B:
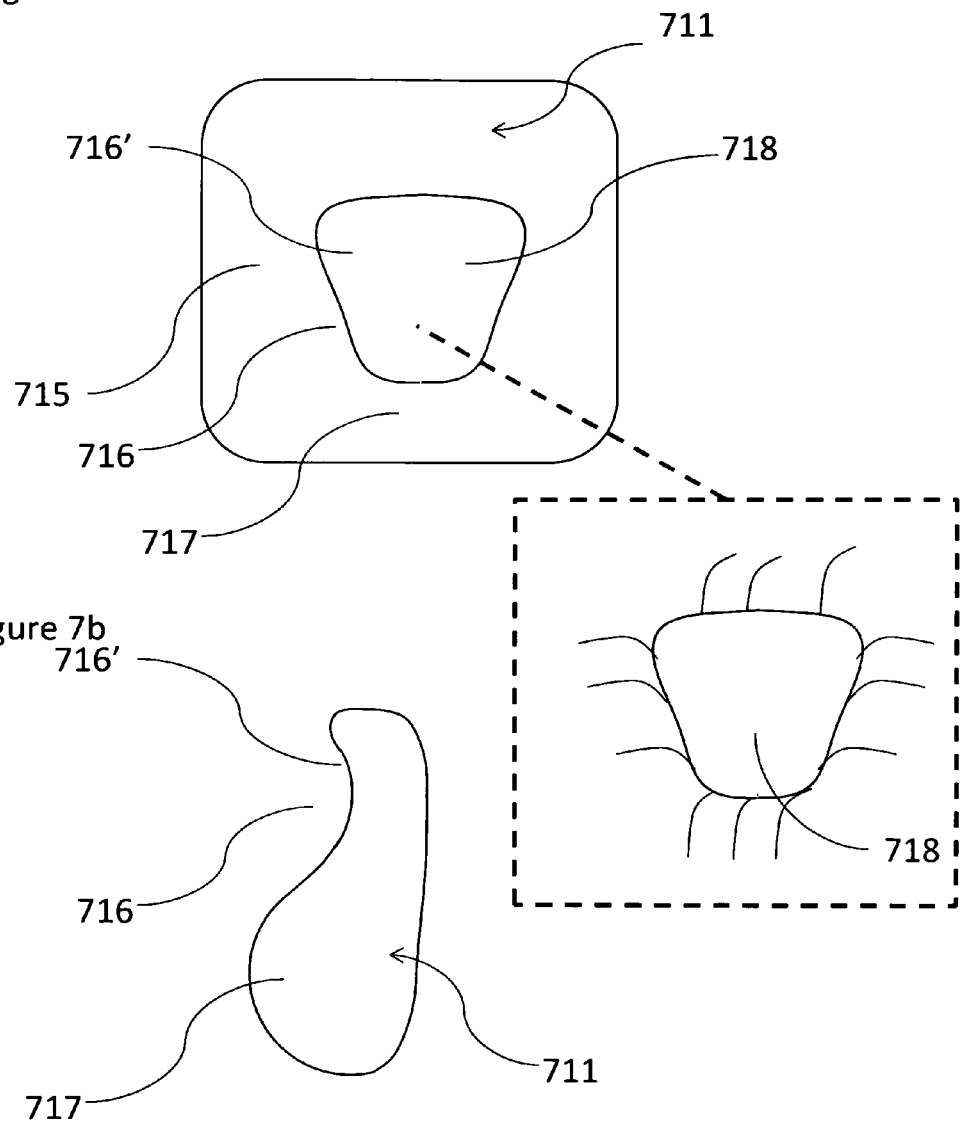

FIG. 7a illustrates a front view of another embodiment of the protective headrest, shown generally at 711. FIG. 7b illustrates a side view of the embodiment of FIG. 7a. Protective headrest 711 includes semi-spherical concave curvature 716' of head support segment 716, as well as a convex cervical of a spine support segment 717. In this embodiment, semi-spherical concave curvature 716' of head support segment 716 is formed as an aperture 718 adapted to receive the center-gravity region (center back) of a user's head.

Figure 8A:
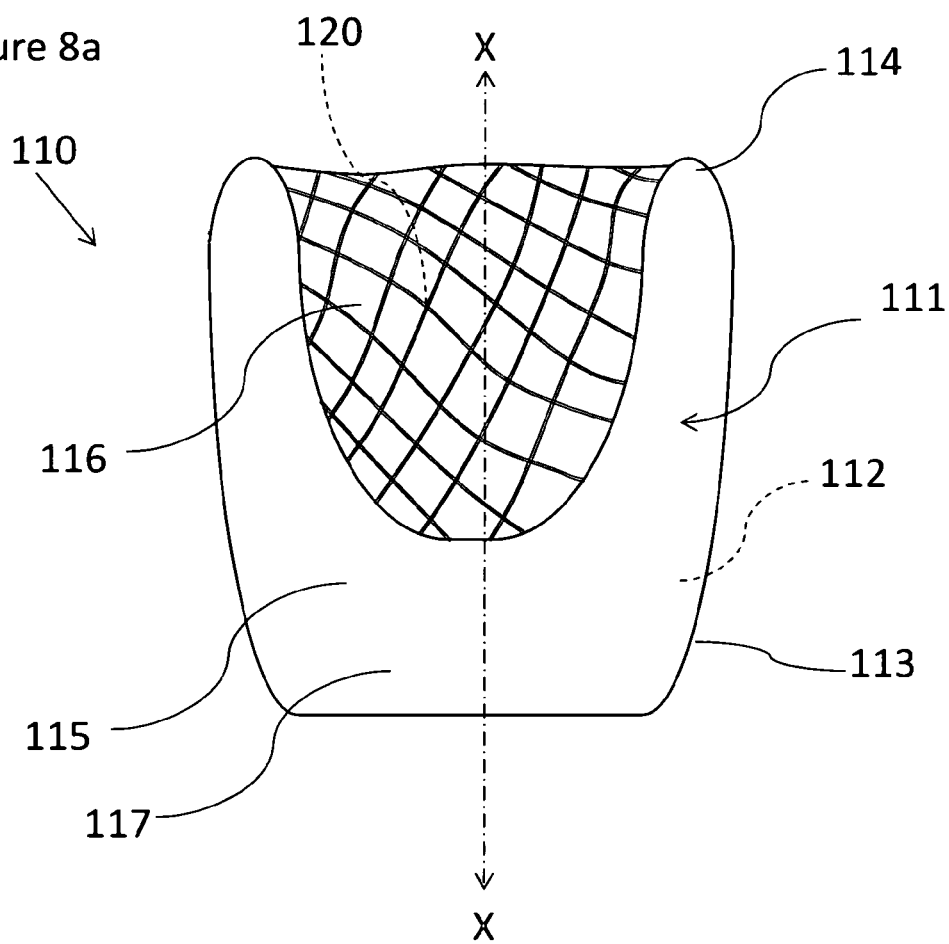
FIG. 8a illustrates a front view of another embodiment of the protective headrest.
Figure 8B:
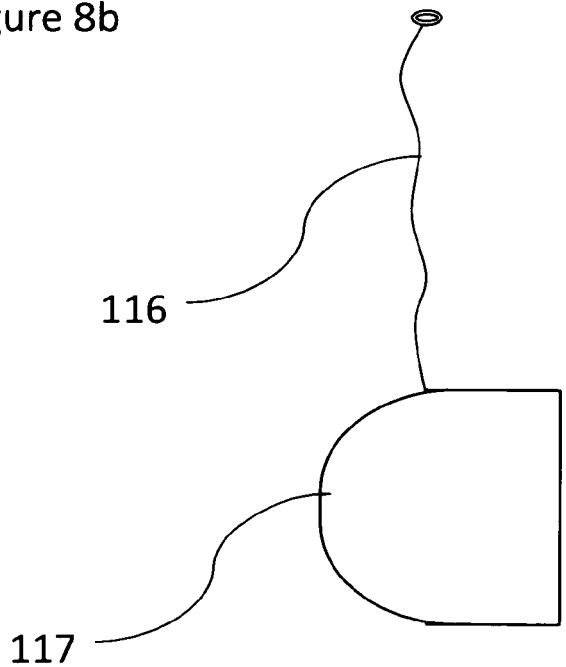

FIGS. 8a and 8b illustrate another embodiment of the protective headrest, shown generally at 110. The protective headrest for land vehicles 111 is shown not anchored to a seat in a land vehicle. Headrest 111 generally comprises a back wall 112, sides 113, top 114 and front wall 115. Front wall 115 generally includes a head support segment 116 and a spine support segment 117. Head support segment 116 has a substantially concave curvature in relation to a passenger's head. In this manner, head support segment 116 conforms to and cradles the passenger's head. In the embodiment shown, head support segment 116 is semi-spherical/semicircular in shape, or moldable. Mold-ability is achieved by using flexible resilient foam or using a flexible netting material. Spine support segment 117 has a substantially convex curvature in relation to a passenger's spine region proximate to the passenger's head. Convex curvature of the spine support segment 117 is adapted to conform to and cradle and support the passenger's spine region. Ergonomic support is thus provided to the passenger's head and spine.

Other embodiments of the protective headrest include a foam insert located in the head support segment, and/or in the spine support segment to dampen the forces related to acceleration/deceleration injury (i.e. whiplash). The optional foam insert is preferably a memory foam or the like that conforms to and cradles the passenger's head and/or spine region. In conjunction with, or alternatively to a foam insert, there may be used foam beads/balls, soybeans or other small particulates that form a bean bag type cushioning effect. Other inserts contemplated include egg-crate shaped foam pad inserts, and/or tempurpedic foam cushions. The subject protective headrest for land vehicles may be anchored to a seat in a land vehicle. Alternatively, the subject protective headrest can be utilized in non-land vehicles as well, including, inter alia, water vehicles (boats), air vehicles (air planes), and the like. It should be noted that the subject protective headrest may be integrated within the seat or may be an add-on headrest or a headrest covering or attachment.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:
1. A protective headrest for a vehicle comprising:
a. a back wall, sides, top and front wall;
b. said front wall having a head support segment co-joined and adjacent to a spine support segment;
c. said head support segment having a semi-spherical concave curvature adapted and shaped to correspond to a passenger's head;
d. said spine support segment being substantially shaped as a convex curvature adapted and shaped to correspond to said passenger's spine region; and
e. said spine support segment being located proximate and adjacent to said head support segment on a vertical plane.
f. said semi-spherical concave curvature of said head support segment having an aperture or opening adapted and shaped to correspond to said passenger's head; and said aperture or opening including a flexible netting material therein.

2. A protective headrest as recited by claim 1, wherein said vehicle is a land vehicle.

3. A protective headrest as recited by claim 1, wherein said semi-spherical concave curvature of said head support segment includes an internal cavity therein having a head support memory foam insert.

4. A protective headrest as recited by claim 1, wherein said spine support segment includes an internal cavity therein having a spine support memory foam insert.

5. A protective headrest as recited by claim 1, wherein said semi-spherical concave curvature of said head support segment includes a pod substantially filled with small particles that move to and fro upon a force subjected upon them.

6. A protective headrest as recited by claim 5, wherein said small particles are foam beads, balls or soy beans.

7. A protective headrest as recited by claim 1, wherein said semi-spherical concave curvature of said head support segment includes an egg-crate shaped foam pad insert or resilient foam cushion.

8. A protective headrest as recited by claim 1, wherein said protective headrest includes support rods integrated therein, wherein said support rods are appointed to be received within a seat construct.

9. A protective headrest as recited by claim 1, wherein said protective headrest is adapted to be placed over an existing headrest in said vehicle.

10. A protective headrest as recited by claim 1, wherein said vehicle is a non-land vehicle such as a boat or air plane.

11. A protective headrest as recited by claim 1, wherein said head support segment includes parallel lateral segments located on opposing sides of said semi-spherical concave curvature.

12. A protective headrest as recited by claim 1 comprising a substantially u-shaped back extension appending from said back wall of said protective headrest, said u-shaped back extension adapted and shaped to correspond with a vehicle headrest for mounting said protective headrest over said vehicle headrest.

13. A protective headrest as recited by claim 1, wherein said protective headrest includes support rods in communication with a tilting mechanism integrated therein for to and fro movement of said protective headrest.

14. A protective headrest as recited by claim 13, wherein said tilting mechanism is constructed as a ball-and-joint mechanism.

* * * * *